(No Model.) 2 Sheets—Sheet 1.

E. M. WRIGHT.
BURNER FOR OIL STOVES.

No. 493,743. Patented Mar. 21, 1893.

Witnesses.
Allan T. Bennett
Henry C. Ashbery

Elias M. Wright, Inventor.
By James Sangster
Attorney.

(No Model.) 2 Sheets—Sheet 2.

E. M. WRIGHT.
BURNER FOR OIL STOVES.

No. 493,743. Patented Mar. 21, 1893.

Witnesses.
Allen T. Bennett
Henry C. Ashbery

Elias M. Wright, Inventor.
By James Sangster
Attorney.

UNITED STATES PATENT OFFICE.

ELIAS M. WRIGHT, OF BUFFALO, NEW YORK.

BURNER FOR OIL-STOVES.

SPECIFICATION forming part of Letters Patent No. 493,743, dated March 21, 1893.

Application filed May 3, 1892. Serial No. 431,631. (No model.)

*To all whom it may concern:*

Be it known that I, ELIAS M. WRIGHT, a citizen of the United States, residing at Buffalo, in the county of Erie and State of New York, have invented certain new and useful Improvements in Burners for Oil-Stoves, of which the following is a specification.

My invention relates to certain improvements in oil burning lamps, for heating or cooking stoves, or for other purposes for which it may be adapted and its construction and operation will be fully and clearly hereinafter described and claimed, reference being had to the accompanying drawings, in which:—

Figure 1:
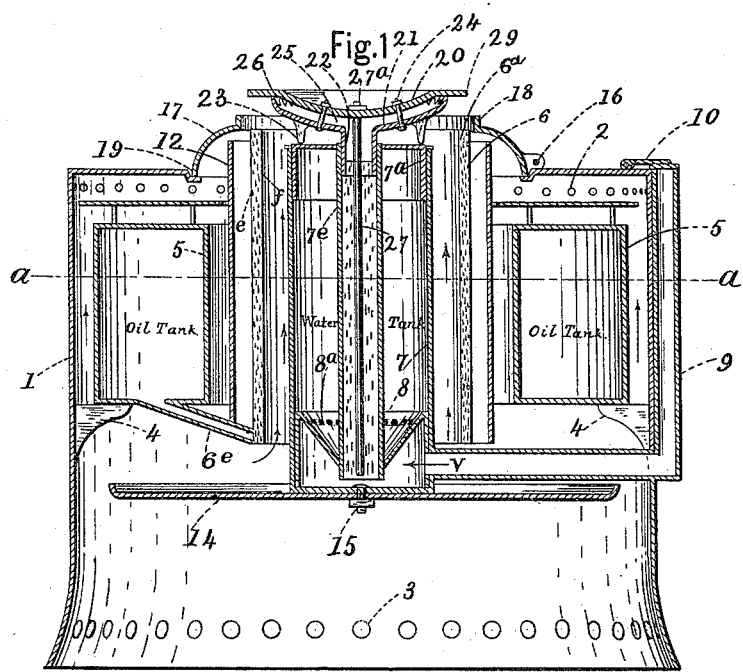
Figure 2:
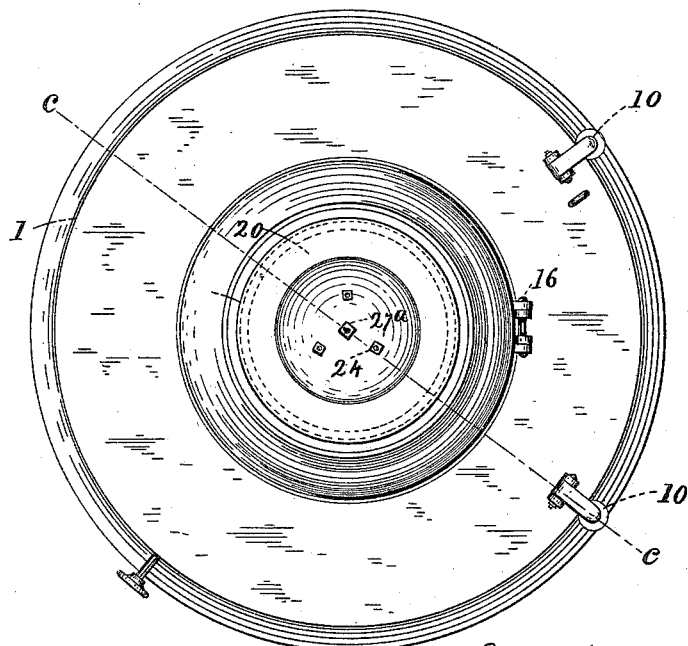
Figure 3:
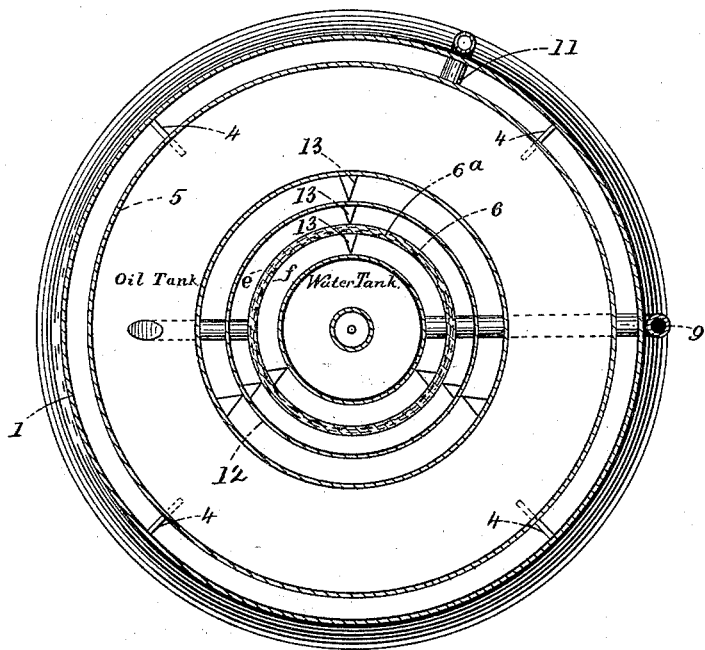
Figure 4:
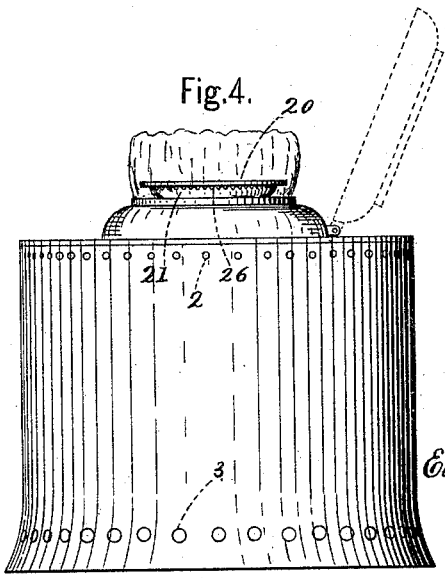

Figure 1 is a vertical central section in or about line $c\ c$, Fig. 2. Fig. 2 is a top view of the lamp. Fig. 3 is a horizontal section on or about line $a\ a$, Fig. 1. Fig. 4 is a side elevation, the flame guiding hinged collar being shown in its upward position by dotted lines.

The object of my invention is to provide a lamp adapted for burning kerosene or other oils, whereby a more perfect combustion of the oil is obtained and consequently, a greater quantity of heat is given out in proportion to the amount of oil used, and whereby a perfectly odorless combustion takes place, so that the lamp may be used as well in the parlor as elsewhere.

Referring to the drawings, 1 represents the outside casing of the lamp. At the top is a series of small perforations, 2, and at or near the bottom is another series of perforations, 3, to supply the lamp with air. It is also provided with a series of brackets 4, rigidly secured to the inner sides of the case 1, (see Figs. 1 and 3,) upon which is secured the annular oil tank, 5. This oil tank 5, is constructed of sheet metal put together and secured in the usual way.

The oil wick tube, 6, is composed of the two walls $e$ and $f$, made in the ordinary manner, the walls being far enough apart to allow the usual wick, $6^a$, to be put in. It is connected at the bottom with the oil tank, 5, by means of a pipe, $6^e$. (See Fig. 1.)

The water wick tube, $7^e$, is located centrally within the water tank, 7, and is supported at the lower end within the water tank, by an inverted cone shaped case, 8, just large enough to allow it to slip down to the bottom of the water tank, 7, and having a contracted opening large enough to permit the lower end of the wick tube to pass in substantially as shown in Fig. 1, the cone shaped portion is provided with a series of perforations or openings, $8^a$, to allow the water to pass through and fill the water tank above it. The top of the wick tube is secured centrally by the cover, $7^a$, which fits in the top of the water tank and is provided with a central hole just large enough to allow the top of the wick tube to pass in substantially as shown in Fig. 1.

The inlet pipe, 9, for conducting water to the water tank is shown in Fig. 1 the water passing into the tank in the direction of the arrow, $v$. At the top, the inlet pipe, 9, is provided with a hinged cover, 10, see Figs. 1 and 2.

The water tank is supplied with water poured into the pipe, 9, the cover, 10, being opened for that purpose. The oil tank also has a feeding or inlet pipe, 11, see Fig. 3, where it is shown connected with the oil tank. The top of the pipe, 11, is also provided with a hinged cover, 10, shown in Fig. 2.

The water tank, oil wick-tube, and a partition, 12, surrounding the oil wick-tube are all connected together and to the water tank by bent pieces of sheet metal, 13, see Fig. 3, all of which are soldered (or riveted) in the usual way so that all are firmly held in their proper positions together, supporting each other.

The partition, 12, is located between the oil wick and the inner sides of the oil tank. At the bottom of the water tank is secured a shallow circular tray, 14, by means of a bolt and screw nut 15, see Fig. 1. This tray protects the floor or carpet upon which the lamp, (or the stove in which the lamp may be used) may be set, from the dripping of oil or dirt, or small portions of the wick as the lamp is being trimmed, thereby preventing entirely, any possibility of fire, which has been known to occur from this cause in lamps of the ordinary construction. This tray is therefore a feature of considerable importance in this connection.

At the top of the case, 1, is pivoted by a pin, 16, a collar, 17. This collar has an opening in the center provided with an upwardly projecting flange 18. The object in hinging this collar to the top of the lamp is to provide the means for getting at the upper parts of the lamp for trimming or cleaning it or for other purposes; its outer edge, when closed fits down into a circular recess, 19, see Fig. 1.

At the top of the wick tube is what may be termed a steam and flame spreader. It is composed of two shells, the upper one 20 and the lower shell, 21. The lower shell is provided with a downwardly projecting tubular portion, 22, which fits in the top of the wick tube and is prevented from passing down too far by the feet, 23, which rest upon the cover, 7ª. The upper and lower parts composing the steam and flame spreader are secured together by bolts, 24, see Fig. 1. They are both made concave so that when thus put together they leave an open space, 25, between them which communicates through the lower pipe portion, with the water wick tube. Where the upper edges of the lower shell of the steam and flame spreader come in contact with the upper shell, is a series of teeth, 26, (see Figs. 1 and 4,) which leave openings through which the steam issues when the lamp is in operation. In the center of the upper shell is a copper rod, 27, rigidly secured to it by a bolt, 27ª. This copper rod projects down through the water wick and conducts the heat downward into the wick when the lamp is burning. The upper part of the steam and flame spreader extends over the oil wick tube all around (see Figs. 1 and 4), consequently the flame as it passes up, passes close to the peripheral edge, 29, of the flame spreader, the vertical flange, 18, on the collar assisting in keeping the flame against the edge, 29.

From the above construction the steam and flame spreader receives a high heat so that the steam as it rises from the water wick tube becomes superheated before it passes into the flame, which it is forced to do, as it has no other outlet. By this operation the oxygen unites with the carbon and thereby produces a more perfect combustion which effectually destroys all odor arising from the oil and with the aid of the hydrogen set free a great amount of heat is produced from a comparatively small quantity of oil.

I claim as my invention—

1. A combined steam and flame spreader for oil lamps consisting of two shells secured together so as to leave an open space between them, the peripheral edge of the upper shell projecting beyond the edge of the lower shell, a series of openings around the periphery of the lower shell and a tubular portion projecting down therefrom to connect with the water wick tube, for the purposes described.

2. The combination with the water tank of a water wick tube secured centrally within it at the top and bottom, a hollow steam and flame spreader having openings at the periphery of the lower shell and a means for connecting it to the water wick tube, an oil wick inclosed within a wick tube surrounding the water vessel and connected with an oil reservoir, for supplying it with oil, a collar having inclined deflecting sides and an upward projecting rim surrounding its central opening, for directing the flame toward the spreader, whereby the steam rising from the water wick will be conducted from the water wick tube to the steam and flame spreader and superheated, and from thence into the flame, substantially as described.

3. In an oil lamp, a water tank located centrally within the oil wick tube, in combination with a water wick tube located centrally within the water tank and a hollow flame and steam spreader connected with the water wick tube and provided with a copper rod extending down through the water wick for conducting the heat downward into the water wick, substantially as described.

4. In an oil lamp, the combination therewith of a feed pipe extending down outside of the lamp case and then horizontally under the oil tank to the water tank, and a hinged cover at the top, for the purposes described.

5. A hollow steam spreader having a series of small openings around its under periphery, a series of lugs by which it is supported on the top of the water tank and a downward projecting pipe for connecting it with the water wick tube, substantially as described.

ELIAS M. WRIGHT.

Witnesses:
JAMES SANGSTER,
CORA S. SANGSTER.